United States Patent [19]
Perry Robert J. et al.

[11] Patent Number: 4,933,419
[45] Date of Patent: Jun. 12, 1990

[54] PREPARATION OF POLYESTERS BY A CONDENSATION REACTION BETWEEN ARYL DIODIDE AND AN ALKYL OR ARYL DIOL.

[75] Inventors: Perry Robert J.; S. Richard Turner, both of Pittsford, N.Y.

[73] Assignee: Eastman Kodak Company, Rochester, N.Y.

[21] Appl. No.: 366,076

[22] Filed: Jun. 14, 1989

[51] Int. Cl.$^5$ .................... C08G 61/00; C08G 63/34
[52] U.S. Cl. .................................. 528/86; 528/397; 528/425
[58] Field of Search .................... 528/86, 397, 425

[56] References Cited

PUBLICATIONS

Schoenberg et al., J. Org. Chem., 39, No. 23, 3318 (1974).
R. F. Heck, Palladium Reagents in Organic Syntheses, Academic Press, New York, NY (1985), pp. 348–352.
Yoneyama et al., Macromolecules (1988), 21, pp. 1908–1911.

Primary Examiner—Harold D. Anderson
Assistant Examiner—T. Mosley
Attorney, Agent, or Firm—Robert A. Linn

[57] ABSTRACT

Polyesters are prepared by a condensation reaction between an aryl diodide and an alkyl or aryl diol. The process is conducted in the presence of carbon monoxide, a palladium catalyst, a base to react with by-product hydrogen iodide, and a solvent.

9 Claims, No Drawings

PREPARATION OF POLYESTERS BY A CONDENSATION REACTION BETWEEN ARYL DIODIDE AND AN ALKYL OR ARYL DIOL.

FIELD OF THE INVENTION

This invention relates to a process for the preparation of polyesters. In a preferred embodiment it relates to a preparation of linear polyesters. In the process, an aromatic iodide, such as a diiodobenzene or diiodonaphthalene, is used as a starting material. The process involves a carbonyl insertion catalyzed by a palladium catalyst. It can be conducted using aromatic or aliphatic diols.

BACKGROUND OF THE INVENTION

Polyesters are important articles of commerce. Generally, they are prepared by the following processes:
1. Esterification of a hydroxycarboxylic acid.
2. Esterification of a diacid and a diol.
3. Ester interchange with alcohol.
4. Ester interchange with ester.
5. Esterification of acid chlorides.
6. Lactone polymerization.

Ester interchange reactions are commercially important since (a) methyl esters are easier to purify than the diacids themselves, and (b) by-product methanol is easily removed by distillation. For example, poly(ethylene terephthalate) is made commercially by a process which comprises:

(i) reacting dimethylterephthalate with ethylene glycol at a temperature below 200° C. to produce 2-hydroxyethylterephthalate, and (ii) producing the polymer by raising the temperature above the melting point of the polymer, ca. 260° C. As can be seen, polymer formation requires a fairly elevated temperature.

The carbonylation of aryl bromides and iodides using $Pd(PPh_3)_2X_2$ as a catalyst to produce monomeric esters is known. Until this invention, such carbonylations have not been used to produce polyesters.

RELATED ART

Schoenberg et al, *J. Org. Chem.* 39, No. 23, 3318 (1974) discloses that (monomeric) esters are prepared by reacting aryl iodides with carbon monoxide and an alcohol in the presence of a tertiary amine and a catalytic amount of a palladium-triphenylphosphine complex.

The process is further discussed in R. F. Heck, *Palladium Reagents in Organic Syntheses*, Academic Press, New York, N. Y. (1985), pages 348-352.

Yoneyama et al, *Macromolecules* (1988) 21, pages 1908-1911, discloses the synthesis of aromatic polyamides by palladium-catalyzed polycondensation of aromatic dibromides, aromatic diamines, and carbon monoxide.

SUMMARY OF THE INVENTION

In this invention, Applicants provide a polyester synthesis which does not require the use of the high temperatures which are used in competitive processes. The inventive method uses a palladium catalyzed carbonylation. In addition, the new method uses polyiodinated compounds as raw materials. Such materials can be produced by methods described in U.S. Pat. Nos. 4,746,758; 4,792,641; and 4,792,642.

In view of the commercial importance of polyesters, new methods for preparing them are always of interest.

In view of the advantages and features of the process mentioned above, it is believed that the process of this invention is a significant advance in the art.

DESCRIPTION OF PREFERRED EMBODIMENTS

This invention provides a condensation reaction for the preparation of polyesters. The process is conducted in the presence of carbon monoxide under conditions in which carbonylation takes place. In the process, a polyol and a polyiodoaromatic compound are used as raw materials.

The process can be conducted employing monofunctional compounds, difunctional monomers, and monomers having a functionality greater than two. The monofunctional materials can be employed as end-capping agents or to stop chain growth. Generally speaking, use of difunctional monomers leads to the preparation of linear polymers, which are preferred. Use of monomers having a functionality greater than two can introduce branching into the polymeric product.

The process of this invention is not limited to the use of any particular polyol. It is preferably conducted using polyols known as starting materials for the preparation of polyesters. Diols are preferred.

Symmetrical diols, such as ethylene glycol, are used when it is desired to make a product which has an appreciable degree of crystallinity. More preferably, the hydroxy groups are on terminal carbon atoms. Such materials are represented by the formula $HOCH_2(CH_2)_xCH_2OH$ wherein x is equal to zero, or a small whole number up to about four. Diols of this type are illustrated by ethylene glycol, 1,4-butanediol, and 1,6-hexanediol.

It is not essential that the chain be linear; for example, neopentylglycol, i.e. 2,2-dimethyl-1,3-propanediol, can be employed. The diols may contain halogens such as fluorine in $HOCH_2(CF_2)_xCH_2OH$ wherein x is 1 to 4.

The diol need not be aliphatic. A preferred diol is bisphenol A. Of the diols, ethylene glycol, diethylene glycol, 1,4-butanediol and bisphenol A are highly preferred.

The process of this invention comprises reacting one or more polyols, such as the diols discussed above, with at least one aromatic compound having at least two iodines bonded to an aromatic nucleus. The iodines may be bonded to the same or different aromatic rings in the molecule. Compounds with two reactable iodines are preferred, but higher derivatives such as triiodoaromatics can be used.

The process of this invention is not limited to any aromatic system. Thus, the invention can be applied to any polyiodoaromatic which reacts under the reaction conditions employed to give a polyester. Preferably, the iodoaromatic is stable enough under the reaction conditions employed, so that an unacceptable amount of by-product(s) is not formed. It is also preferred that the iodoaromatics be free of groups which unduly retard the reaction by steric hindrance or by lowering the activity of the catalyst.

Suitable aromatic compounds include hydrocarbonaromatics, nitrogen containing aromatics and sulfur-containing aromatics and oxygen-containing aromatics such as dibenzofuran. Typical hydrocarbon aromatics include benzene and biphenyl, and condensed ring aromatics such as naphthalene and anthracene. Sulfur-containing aromatics include thiophene and benzothiophene. Nitrogen-containing aromatics include pyridine and benzopyridine. The iodo substituents may be bonded to substituted or unsubstituted aromatics. Substituted aromatics are exemplified by compounds such as aryl sulfones, diaryl ethers, diaryl carbonyls, diaryl sulfides, and the like.

Of these compounds, m-diiodobenzene, p-diiodobenzene, and 2,6-diiodonaphthalene are preferred.

The polyol and polyiodoaromatic reactants are contacted with carbon monoxide. The CO may be at atmospheric pressure or at a higher pressure. Thus, for example, carbon monoxide pressures in the range of from about 1 to about 200 atmospheres or higher can be used in the process of this invention. Pressures lower than atmospheric can be used if desired.

The process proceeds well when the reactants are contacted in stoichiometric amounts. However, it is not necessary to use stoichiometric quantities. An excess of one or more reactants can be used to drive the reaction toward completion. A convenient amount of excess is preferably used. In other words, one employs an amount of excess which provides the desired result, but which does not unduly hinder the process by adding unacceptable cost, or by complicating the process by making it unduly difficult to separate product from unreacted materials.

It is convenient to add an excess of carbon monoxide to the reaction zone. The excess of CO need not be measured; one may merely pressurize the vessel with CO to the desired reaction pressure. When one of the organic reactants is used in excess, it is preferably used in an amount of from 1.001 to about 5 times the molar amount required by stoichiometry.

The process of this invention is conducted in the presence of a liquid reaction medium to facilitate contacting the reactants. A wide variety of organic compounds can be used for this purpose so long as the reaction medium is "inert", i.e., does not enter into the reaction in an undesired way. It is preferred that the reaction medium dissolve the reactant(s) to an appreciable extent. An ether solvent can be used. A preferred solvent of this type is tetrahydrofuran or diglyme (2-methoxyethyl ether), or glyme (1,2-dimethoxyethane). A dipolar aprotic solvent is preferentially employed. Such solvents are characterized by the lack of acidic, easily abstractable hydrogens and by being a highly polar molecule. Typical dipolar aprotic solvents are dimethylformamide, dimethylacetamide, dimethylsulfoxide, hexamethylphosphoramide, and the like.

The amount of liquid reaction medium is not critical. Generally, one uses enough medium to facilitate the reaction. There is no real upper limit on the amount of reaction medium employed. However, practical limits are imposed by the size of the reaction vessel, the ease of separation of product(s) from the reaction medium, process cost, and similar considerations. Generally, the amount of liquid reaction medium employed is within the range of from about 0.1 to about 800 volumes based on the volume of iodoaromatic employed.

The process of this invention is conducted in the presence of a catalyst. The catalyst is preferentially a palladium compound, where palladium is present in the zerovalent or divalent state. Other transition metal catalysts, e.g., nickel and cobalt catalyst can be used. The palladium catalysts generally have one or more ligands bonded to the palladium atom(s) by ionic or covalent bonds. Simple palladium salts such as $PdX_2$ wherein X is Cl, Br or I can be used. Other representative palladium catalysts are listed below:

TABLE I

| Palladium Catalysts | |
|---|---|
| $Pd^{+2}$ | |
| $PdX_2$ | X = Cl, Br, I |
| $PdX_2L_2$ | X = Cl, Br, I |
| | L = $R_3P$, where R = alkyl or aryl |
| $Pd(OAc)_2$ | OAc = acetate |
| $Pd(OAc)_2L_2$ | OAc = acetate |
| $PdCl_2(RCN)_2$ | R = $CH_3$, Phenyl |
| $PhPdXL_2$ | X = Br, I |
| $PdCl_2(COD)_2$ | COD = cis,cis-1,5-cyclooctadiene |
| $Pd(acac)_2$ | acac = 2,4-pentanedionate |
| $Pd^{(o)}$ | |
| $PdL_4$ | |
| L = $R_3P$ where R = alkyl or aryl | |

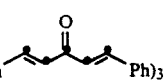

A catalytic amount of catalyst is employed. By "catalytic amount" is meant an amount of catalyst which catalyzes the reaction to the desired extent. Generally, the amount of catalyst is at least about 0.002 mole percent based on the amount of iodoaromatic. There is no real upper limit on the amount of catalyst, this being defined by secondary conditions such as cost and ease of separation of the catalyst from products and unreacted reactants. A preferred catalytic amount is from about 0.005 to about 0.20 moles per mole of iodoaromatic; more preferably from about 0.03 to about 0.10 mole per mole of iodoaromatic reactant.

The process of this invention is preferably conducted in the presence of a base to neutralize by-product hydrogen iodide. The base may be a tertiary amine such as tributylamine, pyridine, 1,8-diazobicyclo[5,4,0]-7-undecene (DBU) or have the formula:

$N(R)_3$ wherein each R is independently selected from lower alkyl groups having from about 2 to about 6 carbon atoms. The base may be immobilized on a cross-linked polymer such as cross-linked poly(vinylpyridine) beads. Alternatively, the base may be another type of basic substance which does not react with the reactants, e.g., a metal carbonate such as $K_2CO_3$ or a metal hydroxide such as $Ca(OH)_2$. Generally, one employs at least enough base to react with the by-product HI produced. An excess can be used, if desired.

As with the reactants, solvents and catalysts, a skilled practitioner will recognize that the exact structure of the base is not critical, and the examples of compounds set forth above are merely illustrative and not-limiting examples of materials that can be used in this invention. A skilled practitioner will recognize that other materials can be substituted to achieve similar results.

The process of this invention is preferably conducted at a temperature within the range of from about 85° C. to about 185° C. A preferred temperature range is from about 115° C. to about 185° C. A skilled practitioner will recognize that the reaction temperature is not critical, and that temperatures outside this range can be employed, if desired. Generally, one selects a reaction temperature which affords a reasonable rate of reaction and which does not give an undue amount of decomposition of products or reactants.

The reaction time is not a truly independent variable, but is dependent at least to some extent based on the other reaction parameters selected such as reactivity of the reactants, activity, and amount of catalyst, reaction temperature, pressure, and similar variables. Generally speaking, reaction times within the range of from about 0.1 to about 100 hours are used.

EXAMPLE 1

Preparation of Arylate Homopolymer 1

To a dry 3-neck, round-bottom flask equipped with a stir-bar, gas inlet, condenser, carbon monoxide (CO) balloon, and stopper, was added bisphenol-A(BPA), 577 mg, 2.53 mmol), meta-diiodobenzene (825 mg, 2.53 mmol), palladium tetrakis(triphenylphosphine) ($PdL_4$, 181 mg, 0.157 mmol) and N,N-dimethylacetamide (DMAc, 7.5 mL). The flask was degassed, placed under a CO atmosphere and heated to 115° C. until all the solids had dissolved. Then 1,8-diazabicyclo[5.40]undec-7-ene (DBU, 900 μL, 6.0 mmol) was added. The reaction was allowed to proceed for one hour, then the contents of the flask were precipitated by pouring into methanol. A white powdery material was isolated, washed with methanol, and dried in vacuo to give the polymer product (650 mg, 71%). The polymeric solid was insoluble in common organic solvents. IR (Kbr) 1735 $cm^{-1}$ (indicative of the carbonyl group, C=O, of ArCOOAr).

EXAMPLE 2

Preparation of Arylate Copolymer 2

To a dry 3-neck, round-bottom flask equipped as in Example 1 was added meta-diiodobenzene (759 mg, 2.30 mmol), para-diiodobenzene (325 mg, 0.99 mmol), BPA (753 mg, 3.30 mmol), $PdL_4$ (236 mg, 0.205 mmol) and DMAc (10 mL). The flask was degassed, placed under an atmosphere of CO and heated to 115° C. When the solids had dissolved, DBU (1.20 mL, 8.0 mmol) was added and the reaction allowed to proceed for 2.5 hours. The reaction mixture was precipitated into methanol, washed with methanol, and then dried in vacuo to give a polymeric product (600 mg, 50%) that was soluble in methylene chloride ($CH_2Cl_2$) and hexafluoroisopropanol (HFIP), IV in $CH_2Cl_2$ (25° C., 0.25%)=0.13, IR (KBr) 1735 $cm^{-1}$ (C=O of ArCOOAr).

EXAMPLE 3

Preparation of Poly(1,4-dimethylbutane-4,4'-diphenylsulfonedicarboxylate)

To a Fischer-Porter bottle was added 4,4'-diiododiphenylsulfone (1.735 g, 3.69 mmol), 2,5-hexanediol (436 mg, 3.69 mmol), bis(triphenylphosphine) palladium (II) chloride ($PdCl_2L_2$, 78 mg, 0.111 mmol), triphenylphosphine ($PPh_3$, 58 mg, 0.222 mmol) and DMAC (11.2 mL). The contents of the bottle were degassed, placed under a CO atmosphere, and heated to 90° C. When the solids had dissolved, DBU (1.32 mL, 8.86 mmol) was added and the bottle pressurized to 95 psi CO. After 5.5 hours the contents of the bottle were precipitated into water. The polymeric product was washed with water and dried in vacuo (1.36 g, 93%). IV in $CH_2Cl_2$ (25° C., 0.25%)=0.08. The solid was soluble in common organic solvents. IR (KBr) 1720 $cm^{-1}$ (C=O of Ar-COOR).

The process of the above examples can be repeated using the other iodoaromatics, polyols, catalysts, and solvents, and employing the reaction conditions which are discussed above. Similar results are obtained.

The invention has been described in detail above with particular reference to preferred embodiments thereof. A skilled practitioner familiar with the above detailed description can make many substitutions and modifications without departing from the scope and spirit of the appended claims.

We claim:

1. Process for the preparation of a polyester, said process comprising reacting carbon monoxide, a polyol, and an aryl polydiiodide characterized by having at least two iodo radicals bonded to an aromatic ring; said process being conducted in the presence of a solvent, a palladium catalyst, and a base to react with by-product hydrogen iodide.

2. Process according to claim 1, herein said polyol is a diol.

3. Process according to claim 2 wherein said polyol is bisphenol A.

4. Process according to claim 2 wherein said polyol is a hexanediol.

5. Process according to claim 1 wherein said polyiodide is a diiodide.

6. Process according to claim 5 wherein each iodo substituent is bonded to the same aryl group.

7. Process according to claim 6 wherein said diodide is a diiodobenzene.

8. Process according to claim 6 wherein said diodide is a diiodonaphthalene with one iodo substituent on each benzene ring.

9. Process according to claim 1 wherein the reaction temperature is from about 85° C. to about 185° C.

* * * * *